Patented Mar. 1, 1932

1,847,243

UNITED STATES PATENT OFFICE

HARVEY C. HAYES, OF WASHINGTON, DISTRICT OF COLUMBIA

MEASURING APPARATUS

Application filed July 11, 1925. Serial No. 43,008.

(GRANTED UNDER THE ACT OF MARCH 3, 1883, AS AMENDED APRIL 30, 1928; 370 O. G. 757)

My invention relates generally to an apparatus and method of measuring distance by means of waves and more particularly for determining distances by sound waves.

The distance between two points can be determined by measuring the time of sound transit from one point to the other and multiplying this interval expressed in seconds by the velocity of sound in the intervening medium. Similarly the distance to a sound reflecting surface is given by measuring the time required for a sound signal to travel from the transmitter to the surface and reflect back again to a receiver located near the transmitter. This time interval multiplied by the velocity of sound in the intervening medium is equal to twice the distance from the transmitter to the surface along a direction perpendicular to the surface. In other words the distance from any point to a sound reflecting surface is proportional to the time intervening between the transmitting of a sound signal and the return of its echo from the surface. This type of sound ranging has long been recognized as offering various methods and means for measuring ocean depths and the broad principle has found application in various devices, most of which are complicated and expensive and require a trained operator. Moreover, these devices are in general not self registering or recording and the sounding data depends upon the accuracy with which the operator adjusts the apparatus for an acoustical balance.

It is an object of my invention to provide an apparatus which is self registering or recording and is simple and inexpensive in construction.

Another object of my invention is to provide a device of the character described whose adjustment is automatic.

With the above and other objects in view, my invention consists in the construction, combination and arrangement of parts as will be hereinafter more fully described.

Figure 1:
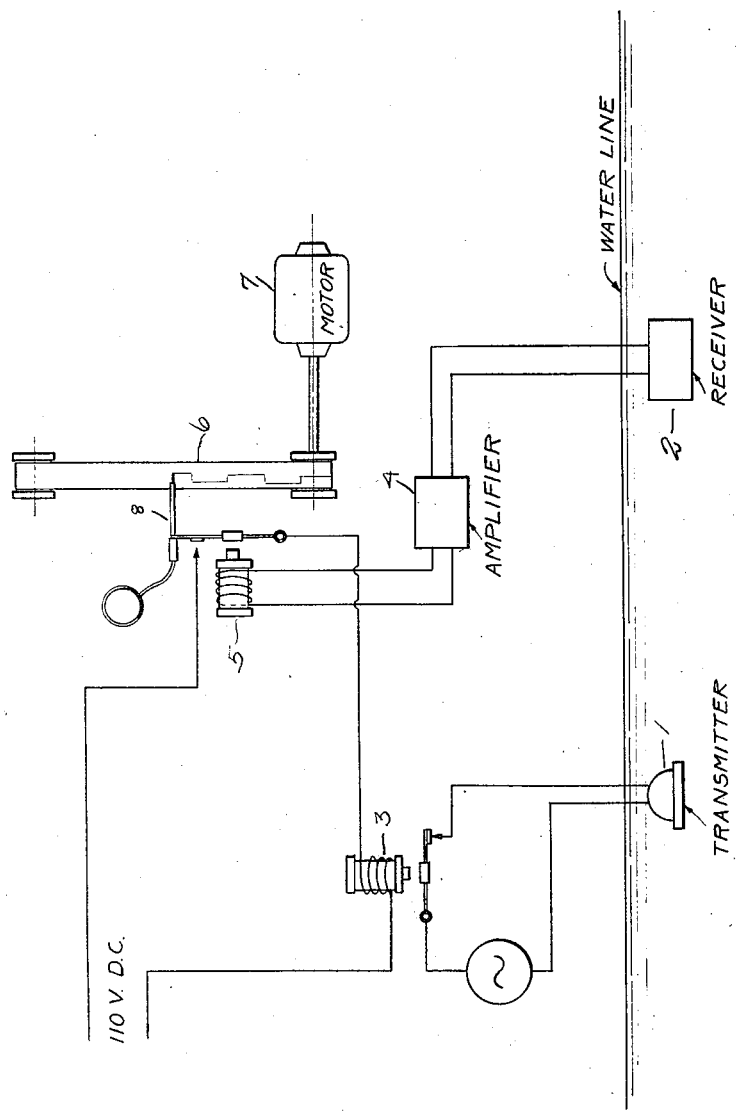
Figure 2:
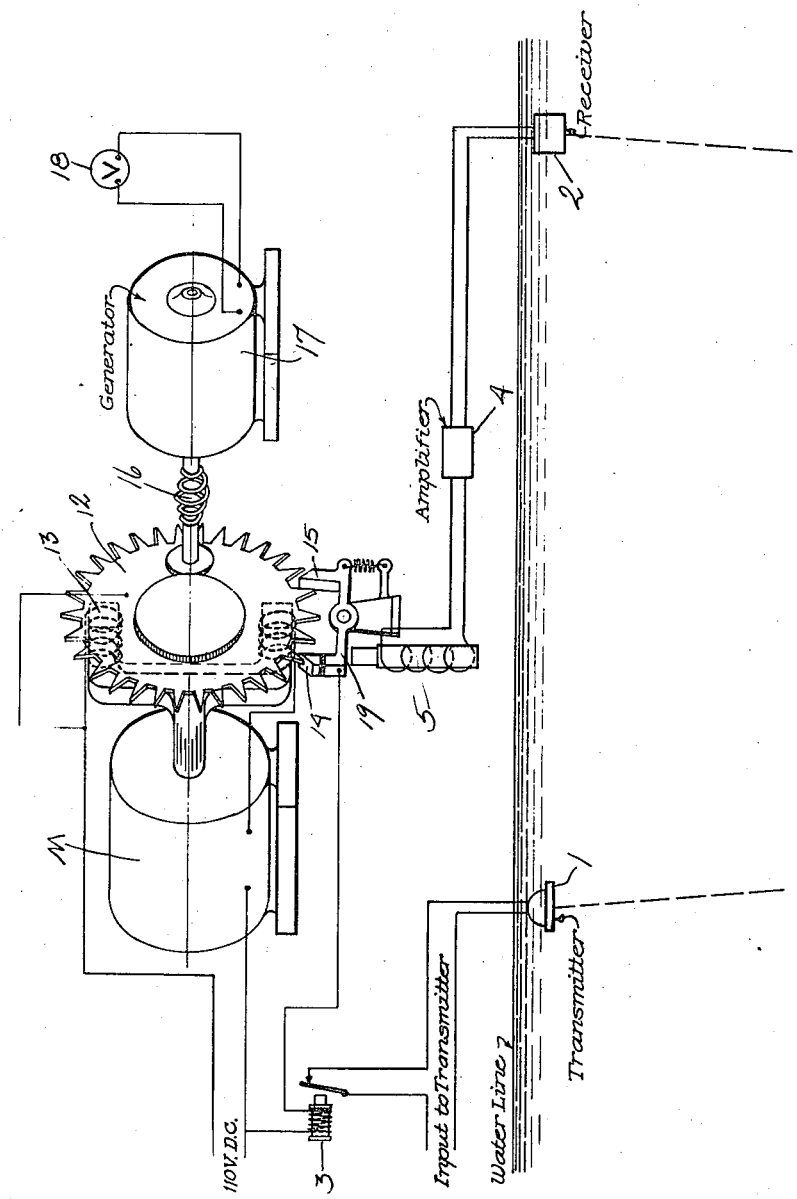
Figure 3:
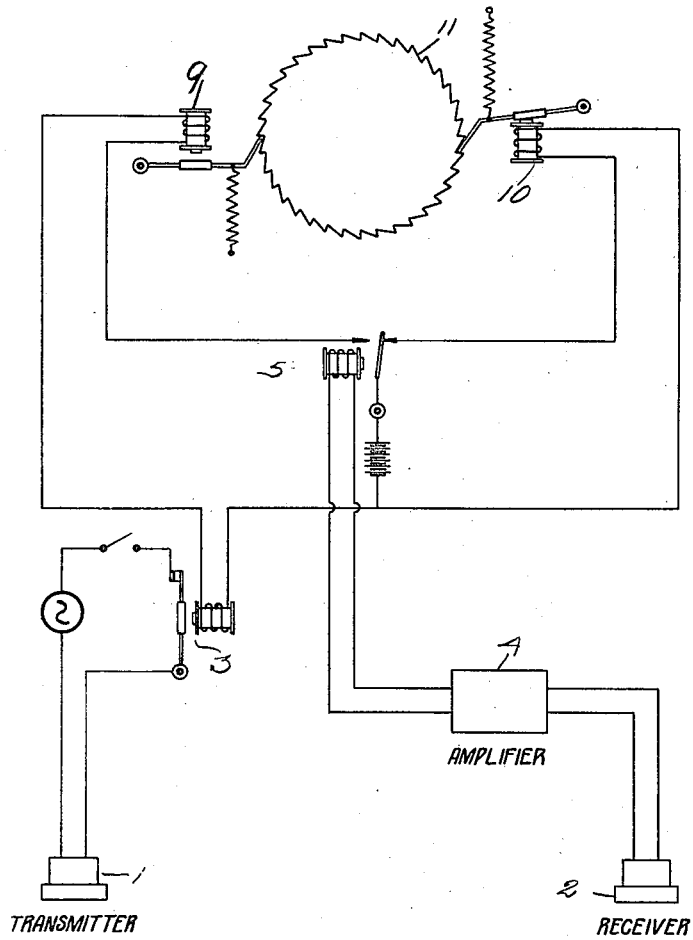

Reference is to be had to the accompanying drawings forming a part of this specification in which like reference characters indicate corresponding parts throughout the several views and in which Figure 1 is a schematic diagram of my invention as employed for recording depth, Figure 2 shows a mechanism wherein the intermittent current that operates the transmitter serves to regulate the speed of rotation of a mechanism in such a way that its angular velocity will be inversely proportional to the depth, and Figure 3 shows the principle of operation of a device which utilizes the intermittent current operating the transmitter key for producing a rotary motion, the angular velocity of which is inversely proportional to the depth.

My researches dealing with submarine acoustics have shown that the local disturbing sounds generated by the splashing of waves against the sides of a vessel as well as the major part of the sounds generated by the propellers are of comparatively low pitch, over ninety per cent of the energy of such sounds being below a pitch of one thousand and none has been detected at a frequency as high as thirty thousand. This information has made it possible to develop a self registering or self recording depth finder for it has shown how to design a sound transmitter and receiver such that the receiver will only respond to the echoes of the transmitted signals.

My invention employs a sound transmitter and receiver pitched well above the local disturbing noises and determines the depth as a function of the frequency of the transmitted signals when the period between the signals is equal to an even multiple of the time required for sound to travel from the transmitter to the sea bottom and return. This relation is automatically maintained by operating the key of the transmitter by the energy which the echoes of the transmitted signals generate in the receiver. This energy may be used directly or in amplified form to operate the transmitter key. The depth is recorded in terms of the length of dashes made on a uniformly moving tape by a pen operated by the same circuit that operates the transmitter key. The depth is proportional to the length of the dashes for their length is proportional to the time of sound transit to the sea bottom and return. The depth is indicated in terms of the speed of a mechanism which is caused to rotate, or the speed of rotation of which is regulated, by the same circuit that operates the transmitter key.

Referring more particularly to the drawings 1, 2, 3 and 4 represent respectively a transmitter, a receiver, a relay that operates the transmitter key and an amplifier for strengthening the received signals. While the particular type of transmitter used does not enter into the invention, it is preferred that the transmitter be of a type capable of sending out signals in the form of buzzes of high pitch. In Figure 1, 5 is a relay operated by the output from the amplifier. In order that the operation of the device may be free from the local disturbing sounds it is preferred that the transmitter 1 and receiver 2 be pitched to the so-called supersonic region, though a frequency within the audible may be employed. A chronograph tape 6 is driven at a constant speed by motor 7, and upon which a recording pen or stylus 8 operates. This pen or stylus makes continuous contact with the tape but is moved trans versely on the tape by the armature of relay 5 which also serves to close the D. C. circuit of my apparatus.

Thus, in the operation of this embodiment of my invention, when the contacts of the relay 3 are closed, a signal comprising a train of sound waves is emitted from the transmitter 1 and passes to the reflecting surface from which it is returned to the receiver 2. The signal is then amplified by means of the amplifier 4 and energizes the coil of relay 5, thus pulling the armature of this relay with the stylus 8 to the left. The armature of the relay 5, being drawn toward the left, closes the circuit through the coil of the relay 3, thus drawing the armature of this relay upwardly and breaking the transmitter circuit. The various parts will remain in this position until the end of the echoed signal has passed through the coil of relay 5, whereupon the armature of this relay and the stylus 8 will take the position to the right as shown in Figure 1. On movement of the armature of relay 5, to the right, the circuit through the coil of relay 3 will be broken and the contacts of the relay closed, thus causing another signal to be emitted from the transmitter.

The stylus which is operated by the receiver circuit traces a broken line on the tape as shown and the distance between breaks is proportional to the depth. The depth can therefore be determined by measuring these lengths with a properly designed scale (not shown). The accuracy of the depth determinations is dependent upon making the speed of the tape such that the length of line between breaks shall be sufficiently great to be measured accurately. For this purpose a gear arrangement (not shown) may be provided so that the speed of the tape can be made high for determining shallow depths and slower for determining greater depths.

In Figure 2 I have shown a slightly modified form of my invention which is used for indicating distance. In this figure 1, 2, 3, 4 and 5 are common with the respective parts in Figure 1, that is, the transmitter circuit is closed through the relay 3 energized from the receiver circuit. Escapement wheel 12 is rotated by a motor M through a clutch member 13, preferably a magnetic clutch while the relay 5 serves to regulate the speed at which motor M will rotate the escapement wheel 12 through an escapement mechanism. This escapement mechanism comprises a rocker arm 19 provided with the tip 14 insulated so there is no electrical contact between the escapement wheel and rocker arm when this tip engages with the escapement wheel, but there is such electrical contact when tip 15 engages the escapement wheel. It will therefore be seen that the receiver circuit acts to attract armature of relay 5 which allows the tip 15 to engage the escapement wheel 12 and thereby closes the circuit through relay 3 and thus break the transmitter circuit. The rocking motion of the rocker arm 19 will be dependent upon the time between transmitter signals and therefore dependent upon the depth, but the speed of rotation of the escapement wheel 12 will be proportional to the time period of the rocker arm 19 and therefore dependent upon the depth. This relation is obviously of the inverse ratio type and the depth is inversely proportional to the speed of the escapement wheel.

The angular velocity of the rotatable escapement wheel 12 is not uniform but proceeds by increments equal to the angle subtended by a tooth. However, a rotating member having proper inertia will have a substantially uniform rotation equal to the average value of rotation of escapement wheel 12 if driven through a flexible coupling 16. This inertia member is shown as a small electrical generator 17 whose speed of rotation is shown on a voltmeter 18 whose scale may be calibrated to read the depth. It is obvious that any type of speed indicator can be employed in place of the generator but the type illustrated is preferred for the reason that it permits of using as many indicators as desired and of placing them wherever it is desired.

Figure 3 shows a modified form over that of Figure 2, in that the rotating element 11 is driven by relays 9 and 10 controlled alternately through the relay 5 which is energized from the output of the amplifier. I have not shown a registering means but it will be understood that I prefer to employ the flexible coupling 16, generator 17 and registering device 18 shown in Figure 2.

It will be understood that the above description and accompanying drawings comprehend only the general and preferred embodiment of my invention and that various minor details in construction and arrangement of parts may be made within the scope of the appended claims and without sacrificing any of the advantages of my invention.

The invention herein described may be manufactured and used by or for the Government of the United States for governmental purposes without the payment to me of any royalty thereon or therefor.

Having thus described my invention what I claim is:

1. In an apparatus of the character described, electromagnetic means for sending compressional wave impulses which may be reflected as echoes, means for receiving said echoes and converting them into electrical impulses, a rotatable element, means connected to said element for indicating its speed of rotation, step-by-step means for retarding the movement of said rotatable element including an escapement, means responsive to the impulses from said receiver for operating said escapement, and a relay for controlling said electromagnetic sending means in response to the acutation of said step-by-step means.

2. In an apparatus of the character described, electromagnetic means for sending compressional wave impulses which may be reflected as echoes, means for receiving said echoes and converting them into electrical impulses, a rotatable element, power means tending to rotate said element, means connected to said element for indicating its speed of rotation, step-by-step means for retarding the movement of said rotatable element including an escapement, electromagnetic means responsive to the impulses from said receiver to operate said escapement to permit step-by-step rotation of said rotatable element, and a relay for controlling said transmitter means including said step-by-step mechanism for closing and opening said relay magnet circuit synchronously with the operation of said escapement.

3. In an apparatus of the character described electromagnetic means for sending compressional wave impulses which may be reflected as echoes, means for receiving said echoes and converting them into electrical impulses, a rotatable element, means connected to said element for indicating its speed of rotation, means for retarding the movement of said rotatable element, means responsive to the impulses from said receiver for operating said retarding means, and means including a relay for controlling the energization of said electromagnetic sending means in response to the actuation of said retarding means.

HARVEY C. HAYES.